United States Patent [19]
Akeley et al.

[11] Patent Number: 5,854,631
[45] Date of Patent: Dec. 29, 1998

[54] SYSTEM AND METHOD FOR MERGING PIXEL FRAGMENTS BASED ON DEPTH RANGE VALUES

[75] Inventors: Kurt Barton Akeley; Carroll Philip Gossett, both of Mountain View, Calif.

[73] Assignee: Silicon Graphics, Inc., Mountain View, Calif.

[21] Appl. No.: 562,283

[22] Filed: Nov. 22, 1995

[51] Int. Cl.$^6$ ................................................. G06T 15/40
[52] U.S. Cl. ........................................... 345/419; 345/422
[58] Field of Search .................................. 395/119, 120, 395/133, 134, 135, 122; 345/419, 420, 422, 434, 433, 435

[56] References Cited

U.S. PATENT DOCUMENTS

| | | | |
|---|---|---|---|
| 4,951,232 | 8/1990 | Hannah .................................... | 364/522 |
| 4,970,499 | 11/1990 | Ryherd et al. .......................... | 395/122 |
| 5,038,297 | 8/1991 | Hannah .................................... | 364/518 |
| 5,245,700 | 9/1993 | Fossum .................................... | 395/122 |
| 5,265,198 | 11/1993 | Gonzalez-Lopez et al. ........... | 395/122 |
| 5,265,199 | 11/1993 | Catlin ...................................... | 395/122 |
| 5,271,094 | 12/1993 | Albaugh et al. ........................ | 395/122 |
| 5,502,798 | 3/1996 | Ito et al. ............................. | 395/122 X |
| 5,583,974 | 12/1996 | Winner et al. ...................... | 395/135 X |

FOREIGN PATENT DOCUMENTS 0300703  1/1989  European Pat. Off. .

OTHER PUBLICATIONS

Carpenter, Loren, "The A–buffer, An Antialiased Hidden Surface Method," *Computer Graphics*, vol. 18, No. 3, Jul., 1984, pp. 103–108.

Catmull, Edwin, "A Hidden–Surface Algorithm With Anti–Aliasing," *Computer Graphics*, vol. 12, No. 3, pp. 6–11, ACM, 1978.

Yamamoto, T., "A Scan Conversion Algorithm Using Quad–Tree Representation of dZ Buffer", *Systems and Computers in Japan*, vol. 23, No. 8, Jan. 1992, pp. 65–74.

*Primary Examiner*—Phu K. Nguyen
*Assistant Examiner*—Cliff N. Vo
*Attorney, Agent, or Firm*—Sterne, Kessler, Goldstein & Fox P.L.L.C.

[57] ABSTRACT

A system and method for merging received pixel fragments with an existing fragment compares a depth range for the received fragment with a depth range for the existing fragment. If there is a range overlap, the new fragment is merged with the existing fragment for which there is overlap. If there is no range overlap, the new fragment is discarded. The merge operation can be performed for fragments received for a single surface, such as the nearest surface. Alternatively, the merge operation can be performed for fragments received for a plurality of surfaces.

25 Claims, 2 Drawing Sheets

SYSTEM AND METHOD FOR MERGING PIXEL FRAGMENTS BASED ON DEPTH RANGE VALUES

BACKGROUND OF THE INVENTION

1. Field of the Invention

This invention relates generally to computer graphics systems, and more specifically to a system and method for merging pixel fragments based on depth range values.

2. Related Art

Computer graphics systems enjoy widespread usage in many facets of business and industry. With the evolution of three-dimensional graphics systems, this usage has increased dramatically. The ability to render three-dimensional images has catapulted computer graphics systems into usage in numerous new applications for which two-dimensional systems were inadequate.

To render three-dimensional images correctly, the graphics system must be capable of handling numerous attributes of three-dimensional images. One such attribute is the phenomenon of hidden surfaces. Simply put, because a three dimensional image includes a depth component, some objects of a scene being rendered may be hidden by other objects which are closer to the viewer. Thus the surfaces of these hidden objects are referred to as hidden surfaces.

Since the dawn of three-dimensional graphics systems, there have been numerous techniques available to designers for handling hidden surfaces. As with almost every other discipline, three-dimensional graphics systems designers must balance the need for image quality with the computational cost required to obtain such quality.

One long-standing technique used by system designers is the well-known Z-buffer. A Z-buffer is an array of Z, or depth, values stored for each pixel in the frame buffer. As each pixel is drawn, its Z value is compared with the Z value of the pixel already drawn. If the Z value of the new pixel indicates that that pixel (i.e., the surface of which that pixel is a part) is in front of the existing pixel, the new pixel replaces the existing pixel in the frame buffer.

Z-buffers are well known in computer graphics systems and have long been used for handling hidden surfaces in three-dimensional graphics systems. Examples of the use of Z-buffers in computer graphics systems can be found in U.S. Pat. No. 4,951,232, to Hannah, U.S. Pat. No. 5,038,297, to Hannah, and U.S. Pat. No. 5,265,199, to Catlin, all of which are assigned to Silicon Graphics, Inc., and all of which are incorporated herein by reference.

Z-buffers are extremely fast and quite simple to implement. However, they are subject to aliasing and cannot handle transparent objects well. Other techniques have been proposed to handle transparent objects. One such technique is the "ultimate" visibility method as described in CATMULL, E., "A Hidden-Surface Algorithm with Anti-Aliasing," *Computer Graphics*, vol. 12, no. 3, pp. 6–11, ACM, 1978. Catmull's anti-aliasing algorithm is an accurate but costly algorithm that does antialiasing by performing object precision weighted area sampling at each pixel. In essence, a full visible-surface algorithm is performed at each pixel, comparing the polygon fragments that project to each pixel. Unfortunately, using a full object-precision visible-surface algorithm at each pixel is more costly than desired for some applications.

Another solution which combines the speed of the Z-buffer with the anti-aliasing benefits of other solutions is the A-buffer. The A-buffer solution approximates Catmull's per-pixel object-precision area sampling with per-pixel image-precision operations performed on a subpixel grid. According to this technique, polygons are processed in scan-line order by clipping them to each square pixel they cover. This creates a list of clipped polygon fragments for each pixel. Each fragment is associated with a bitmask of those parts of the pixel it covers. The bit mask is computed by XORing together masks representing each of the fragment's edges. When all polygons intersecting a pixel have been processed, the area-weighted average of the colors of the pixel's visible surfaces is obtained by selecting fragments in depth-sorted order and using their bit masks to clip those of farther fragments. The bit masks can be easily manipulated using Boolean operations.

According to the A-buffer process, fragments, created during rasterization, are merged in a linked list. The fragments are sorted in order (e.g., front-to-back) before being merged in the frame buffer. Note that if one fragment describes a whole pixel, all other fragments in the list can be discarded. This is referred to as list pruning. Sorting is required for proper calculation of transparency and so that fragments from the same geometric primitive cluster together. Fragments are merged only if they have the same object tag and overlap in Z.

One disadvantage of the A-buffer process is that the lists can become quite long. It would be desirable to have an accurate process without running the risk of obtaining arbitrarily long lists. One way to avoid the arbitrarily long lists is to simply limit the size of the list and discard fragments received after the list reached the maximum length. This, however, yields a less than ideal solution, as potentially important pixel information may be lost.

SUMMARY OF THE INVENTION

The present invention is a system and method for handling surfaces at multiple depths while rendering objects on a display. According to the invention, as fragments are received for storage into a frame buffer, they are grouped according to depth and depth range. For the minimal solution, the only fragments retained are those for the nearest surface. That is, only fragments that belong to the nearest surface and that have a depth range overlapping with that of other fragments for that surface are retained. All other fragments are discarded.

According to the invention, when a fragment is received from the rasterizing portion of the graphics system, the range of depth spanned by the fragment is calculated. According to one embodiment, if the fragment has a depth value indicating that it represents the nearest surface, the depth range is determined and this range compared with the range for an existing fragment for that surface. If the range of the current fragment overlaps the range for the existing fragment (which may be previously merged fragments), the fragment is not discarded. Note that in this first embodiment, because the depth is checked first, the range does not have to be determined for fragments which are not a part of the nearest surface. This embodiment can be implemented without the step of first checking the depth before determining and comparing the range. In this latter variation, the range comparison should be performed for each fragment regardless of the depth of the fragment.

In an alternative embodiment, fragments for multiple surfaces (i.e., surfaces at multiple depths) are maintained in separate groupings (referred to as buckets). In this embodiment, the depth range of a received fragment is compared to the range of a previous fragment received for the same surface. If there is an overlap of the ranges for these two fragments, the fragment is kept for the bucket corresponding to that surface. Thus, the primary difference between these two embodiments, is that the first-described embodiment only keeps fragments representing the surface nearest the viewer, while the second-described embodiment maintains fragments for multiple surfaces. Note that the second embodiment can also be implemented without the need to first check the fragment depth before computing and comparing the depth range. Once the depth range of a fragment is known, this range only needs to be compared with the depth range for the existing fragments.

For a received fragment for which there is no range overlap with the previous fragment, the received fragment is discarded. Each fragment maintained is merged, with the existing fragment for the corresponding bucket (the only bucket in the first-described embodiment). The merging operation can be a simple addition, averaging, sum of squares, or other operation to combine the attribute values of the received fragment with the existing fragment. Depending on the graphics system in which the invention is implemented, the attributes combined can include color, grey scale, and the like. In one embodiment, the merge operation merges only the color values and not the depth or depth range.

In one embodiment, the alpha value for the fragment is checked before the other computations are performed. In this embodiment, if the alpha value indicates that the fragment is totally transparent (e.g., alpha=zero), the fragment is ignored.

An advantage of the invention is that fragments can be received and merged without requiring an arbitrarily long linked list. As the fragments are received, it is determined whether they can be kept or whether they should instead be discarded.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Discussion of the Invention

The present invention is directed toward a system and method for merging pixel fragments based on depth range values. According to the invention, when a pixel fragment is received, its depth range is checked. If the depth range of the newly received fragment overlaps with the depth range of a previously-received fragment (i.e., an existing fragment), the new fragment is merged with the existing fragment.

In one embodiment, only those fragments corresponding to the surface nearest to the viewer are kept, all other fragments are discarded. In this embodiment, when a fragment is received, it is compared to the existing fragment for the nearest surface. If their depth ranges overlap, the new fragment is merged with the existing fragment. In one implementation of this embodiment, the range (Z) of the new fragment is checked first to determine whether the new fragment is part of the nearest surface. If the new fragment is not part of the nearest surface, it is immediately discarded without determining and comparing its range value.

In an alternative embodiment, fragments are kept for a plurality of surfaces. In this embodiment, when a fragment is received it is compared with the previously existing fragments for the plurality of surfaces. When a match is found (i.e., when an existing fragment having an overlapping depth range is found), the newly received fragment is merged with the matching existing fragment.

2. Example Environment

Figure 1:
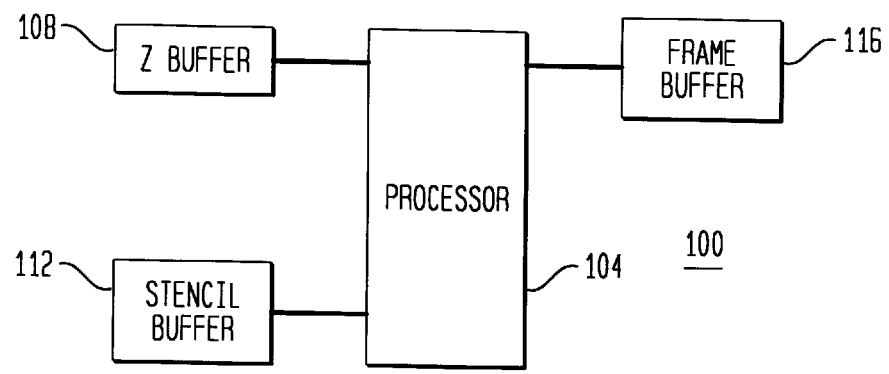
FIG. 1 is a block diagram illustrating a graphics system as an example environment of the invention.

The present invention is suitable for implementation within graphics systems such as those used for flight simulators, graphics workstations, video games, and numerous other applications. Before describing the invention in greater detail, it is useful to generally describe an example graphics system such as can be used with the present invention. This description is provided for illustrative purposes only and should not be construed to limit the scope or applicability of the invention to the specific environment(s) described herein. FIG. 1 is a high-level block diagram illustrating such an example graphics system 100.

Referring now to FIG. 1, an example graphics system 100 typically includes a processor 104, and a frame buffer 116. Many graphics systems can also include a Z-buffer 108, and a stencil buffer 112. Processor 104 can be a microprocessor or other general purpose processor adapted to, or programmed to perform, graphics operations. Also, processor 104 could be implemented using a special purpose graphics processor or graphics update controller. In yet another alternative, processor 104 could be implemented using a combination of a general purpose processor with a graphics coprocessor.

Frame buffer 116 is an array of memory locations, each location corresponding to a point (or pixel) of the image to be displayed. During a process known as rasterization, pixel fragments are created. The fragments are used to update the frame buffer locations corresponding to the fragments.

Depending on the environment in which graphics system 100 is operating, pixel fragments may be generated in different ways. According to one environment known as OpenGL™, fragments are created as a result of rasterization. During rasterization in the OpenGL™ environment, processor 104 converts primitives into a two dimensional image. Each point of this image contains information such as color and depth. It is common to perform the rasterization in two steps: (1) determining in which squares of a grid are occupied by a primitive; and (2) updating appropriate locations in frame buffer 116 based on this information. A grid square, along with its assigned color, depth (Z) and texture values is called a fragment.

The fragment, produced by rasterization, may be used to modify pixel information stored in frame buffer 116. Whether the fragment actually modifies this pixel information can be determined by performing one or more of a series of tests on the fragment. These tests can include, but are not limited to a pixel ownership test, a scissor test, an alpha test a stencil test and a depth buffer test. The pixel ownership test determines if the pixel at the corresponding location in frame buffer 116 is currently owned by the context. The scissor test determines if the fragment lies within a rectangle, known as a scissor rectangle, defined by four values. The alpha test, used in an RGBA mode, compares the alpha value of an incoming fragment with a reference alpha value.

The stencil test conditionally discards a fragment based on a comparison of a stencil value for the fragment with a reference value stored in stencil buffer 112 at a corresponding location. The stencil test is useful for, among other things, drawing coplanar polygons. The Z-buffer test (or depth test) checks a Z value (depth) for the incoming fragment with a Z value stored in the corresponding location in Z-buffer 108. If the comparison indicates that the fragment is behind, or hidden by, the surface of the corresponding pixel in frame buffer 116, the fragment is discarded.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

3. Delta Z Comparison

As stated above, in most if not all graphics systems, several tests are performed to determine whether a fragment is merged with a corresponding pixel value already stored in the frame buffer. According to the present invention, a special test is performed before determining whether a fragment is merged into an existing fragment corresponding to the same pixel location. Generally speaking, the test compares the depth range of the newly received fragment with the depth range of the existing fragment for the pixel in question. If the range of the new fragment overlaps with that of the existing fragment, the new fragment is merged with the existing fragment. More specifically, according to one embodiment, the present invention merges a new fragment into an existing fragment only if the depth range of the fragments is greater than or equal to the absolute distance between the fragments.

Once the merge operation is complete, the existing fragment now comprises the merged values of the new fragment together with the previously existing fragment. In one embodiment, only the color (or grey scale) values are merged into the existing fragment. There is no change to the depth or depth range value as a result of the merge. In an alternative embodiment, other pixel values are merged as well.

In one embodiment, the comparison and merge operations are performed only for the surface that is nearest to the viewer at that pixel location. For ease of discussion, this embodiment is referred to as a single-surface embodiment. In an alternative embodiment, the comparison operation is performed for several different surfaces at various depths, and a newly received fragment is merged with an existing fragment corresponding to the same surface. In this alternative embodiment, a plurality of fragments are maintained, preferably one for each surface. This alternative embodiment is referred to as a multiple-surface embodiment for ease of discussion.

The present invention is now further described in terms of the single-surface embodiment. Where appropriate, reference is made to the multiple-surface embodiment. After reading this description, it will become apparent to a person of ordinary skill in the art how to implement the invention in either the single- or multiple-surface embodiment.

Figure 2:
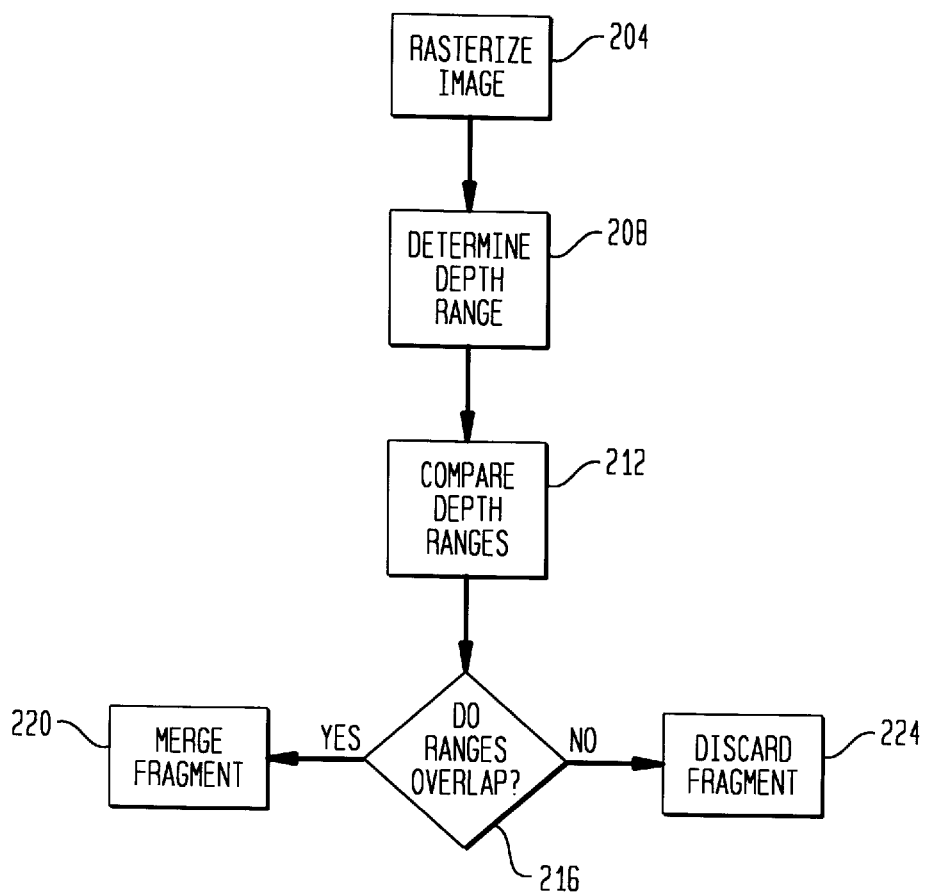
FIG. 2 is an operational flow diagram illustrating a process of determining whether to merge a fragment based on depth range values according to one embodiment of the invention.

FIG. 2 is an operational flow diagram illustrating the operation according to one embodiment of the invention.

Referring now to FIG. 2, generally the graphics system rasterizes the image and in so doing generates fragments for the various pixel locations. This is illustrated by process box 204. In this step, processor 104 computes the appropriate values for each fragment. In one environment, processor 104 computes a change in the range in the x direction (dz/dx) and a change in the range in the y direction (dz/dy) for each pixel as well as color, opacity and depth values. For example, processor 104 may compute a Red, Green, and Blue color value for each pixel, and an alpha value for opacity and a z value for depth. More specifically, processor 104 preferably computes the pixel values for each fragment at the pixel center. This step, illustrated by process box 204 is a known step which can be performed by a conventional processor, such as processor 204.

According to the invention, the depth-range for the fragment is computed from the range values dz/dx and dz/dy. Specifically, according to one embodiment of the invention, the range is computed as:

$$\text{range} = z \pm \left( ABS \frac{dz}{dx} + ABS \frac{dz}{dy} \right)$$

where ABS denotes the absolute value.

In one embodiment, the depth ranges in the x and y directions are collapsed into a single depth range for the fragment. In other words, dz/dx and dz/dy are combined to form a single range $dz/d_{screen}$. This step can be accomplished using a number of different techniques. For example, the collapsing can be performed by simply taking the larger of the two values, taking the sum of the squares of the two values or other techniques. In this embodiment, the range is computed as:

$$\text{range} = z \pm \left( ABS \frac{dz}{d_{screen}} \right)$$

The step of computing the range of the fragment is illustrated by process box 208 in FIG. 2.

Once the range of the fragment is determined, this depth range is compared to the depth range of the existing fragment. This is illustrated in by process box 212. If the ranges overlap, the new fragment is merged with the existing fragment. This is illustrated by process blocks 216 and 220. If there is no overlap, the new fragment is discarded. This is illustrated by process blocks 216 and 224. Note that in a multiple surface environment, the newly received fragment may be compared with a plurality of existing fragments, each representing an existing surface. If an overlap exists with one of these fragments, the new fragment is merged.

Note that in an alternative embodiment, the depth value of the fragment is checked before the range is determined and compared. In the single surface embodiment, if the range indicates that the fragment is not part of the nearest surface, the fragment is discarded without performing the depth range comparison. In the multiple surface embodiment, if the range indicates that the fragment is not part of one of the surfaces being maintained, the fragment is discarded without performing the depth range comparison.

According to one embodiment, the present invention merges a new fragment into an existing fragment only if the depth range of the fragments is greater than or equal to the absolute distance between the fragments. Preferably, the fragments are always merged where the distance between the fragments is zero. Additionally, in one embodiment, it is contemplated that the fragments be merged regardless of whether an overlap exists where the fragments are very near each other. The actual maximum distance limit set for this "always merge" condition may vary depending on the goals of the system designer or applications developer.

Figure 3:
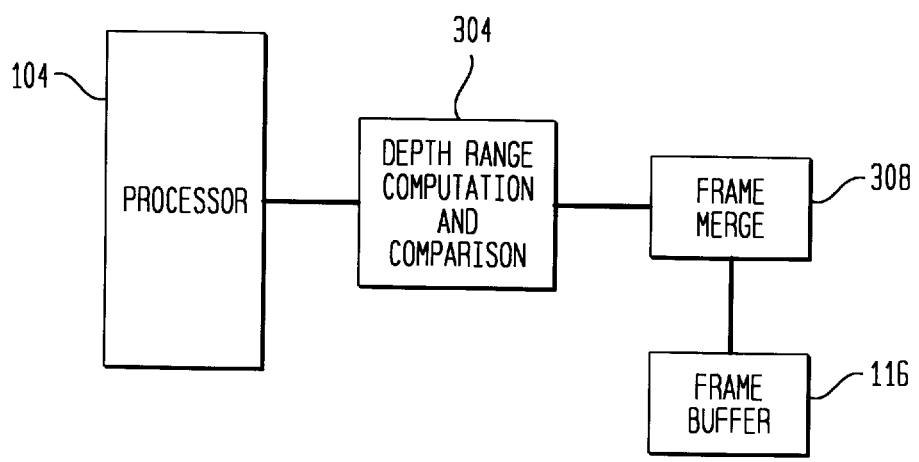
FIG. 3 is a block diagram illustrating a representative functional architecture of the delta-z comparison according to one embodiment of the invention.

FIG. 3 is a diagram illustrating an example architecture according to one embodiment of the invention. Referring now to FIG. 3, the invention according to this architecture includes a depth range computation and comparison function 304 and a frame merge function 308. As illustrated in FIG. 3, these elements interact with processor 104 and frame buffer 116. Specifically, depth range computation and comparison function 304 receives fragments from processor 104 and stores merged fragments into frame buffer 116. This representative architecture, illustrating the functionality of the invention in block diagram form, is provided as an example only. Alternative architectures not departing from the spirit of the invention may be implemented.

As stated above, in one embodiment the merging process merges only the color and opacity values of the fragments. In this embodiment, the depth and depth-range values are not merged. The merging process can be implemented using an addition, averaging, blending, or other like process.

In one embodiment, opacity is monitored and blending used where opacity reaches a certain amount (for example, 100%). In one form of this embodiment, blending is controlled only by the new and current alpha values and depth blending is ignored until the fragment reaches 100%. This avoids blending errors when working with transparent surfaces.

Alternatives and additional functionality can handle specific situations such as decaling. For example, if the incoming fragment is a decal fragment, the coverage of the incoming decal fragment takes precedence over an already present coverage of the existing fragment. Because the sum of the new and existing coverages is greater than 100%, blending is performed simply using the current coverage.

Where the fragment total coverage exceeds 100%, it is preferable that both depth and alpha information must be used to construct the blend factor. In one embodiment, the depth blend is computed first and then modified based on the alpha (opacity) values.

Where the existing fragment is a decal fragment, it is preferable that the coverage at the fragment takes precedence over the coverage of the incoming fragment. Because the sum of the new and existing coverages is greater than 100%, blending is performed by using one minus the current coverage.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method for merging a new fragment with an existing fragment, comprising the steps of:
   determining a depth range for the new fragment;
   comparing said depth range for the new fragment with a depth range of the existing fragment to determine whether said depth range for the new fragment overlaps said depth range of the existing fragment; and
   merging the new fragment with the existing fragment if said depth range for the new fragment overlaps said depth range of the existing fragment.

2. The method of claim 1, further comprising a step of discarding the new fragment if said depth range for the new fragment does not overlap said depth range of the existing fragment.

3. The method of claim 1, wherein said step of determining a depth range for the new fragment comprises the step of computing said depth range as $$z \pm \left( ABS \frac{dz}{dx} + ABS \frac{dz}{dy} \right)$$

for the new fragment.

4. The method of claim 1, wherein said step of determining a depth range for the new fragment comprises the step of computing said depth range as $$z \pm \left( ABS \frac{dz}{d_{screen}} \right)$$

for the new fragment.

5. The method of claim 4, wherein $dz/d_{screen}$ is determined as the maximum of $dz/dx$ and $dz/dy$.

6. The method of claim 4, wherein $dz/d_{screen}$ is determined as the sum of the squares of $dz/dx$ and $dz/dy$.

7. The method of claim 1, wherein the new fragment is always merged with the existing fragment if the distance between the new fragment and the existing fragment is zero.

8. The method of claim 1, wherein the new fragment is always merged with the existing fragment if the absolute distance between the new fragment and the existing fragment is within a maximum distance limit.

9. The method of claim 1, wherein said step of merging comprises the step of adding a fragment value of the new fragment with a fragment value of the existing fragment.

10. The method of claim 1, wherein said step of merging comprises the step of averaging a fragment value of the new fragment with a fragment value of the existing fragment.

11. The method of claim 1, wherein comprising the step of monitoring an opacity value for the existing fragment, and wherein said step of merging comprises the step of blending a fragment value of the new fragment with a fragment value of the existing fragment if said opacity value reaches a determined value.

12. The method of claim 11, wherein said determined value is 100% opacity.

13. The method of claim 1, wherein said step of comparing said depth range for the new fragment with a depth range of the existing fragment is performed for a plurality of existing fragments, each representing a different surface, and said step of merging the new fragment with the existing fragment is performed for one of said plurality of existing fragments for which there was an overlap.

14. A system for rendering an image, comprising:
   means for determining a depth range of a new fragment generated by a processor;
   means for comparing said depth range of said new fragment with a depth range of an existing fragment; and
   means for merging said new fragment with said existing fragment if said depth range of said new fragment overlaps said depth range of said existing fragment.

15. The system of claim 14, further comprising means for discarding said new fragment if said depth range for said new fragment does not overlap said depth range of said existing fragment.

16. The system of claim 14, wherein said means for determining a depth range of said new fragment comprises means for computing said depth range as $$z \pm \left( ABS \frac{dz}{dx} + ABS \frac{dz}{dy} \right)$$

for said new fragment.

17. The system of claim 14, wherein said means for determining a depth range of said new fragment comprises means for computing said depth range as $$z \pm \left( ABS \frac{dz}{d_{screen}} \right)$$

for the new fragment.

18. The system of claim 14, wherein said means for merging said new fragment comprises means for merging said new fragment with said existing fragment regardless of range overlap if the distance between said new fragment and said existing fragment is zero.

19. The system of claim 14, wherein said means for merging said new fragment comprises means for merging said new fragment with said existing fragment regardless of range of overlap if the absolute distance between said new fragment and said existing fragment is within a maximum distance limit.

20. The system of claim 14, wherein said means for merging said new fragment comprises means for adding fragment values of said new fragment with fragment values of said existing fragment.

21. The system of claim 14, wherein said means for merging said new fragment comprises means for averaging fragment values of said new fragment with fragment values of said existing fragment.

22. The system of claim 14, further comprising means for monitoring an opacity value for said existing fragment, and wherein said means for merging comprises means for blending fragment values of said new fragment with fragment values of said existing fragment if said opacity value reaches a determined value.

23. The system of claim 22, wherein said determined value is 100% opacity.

24. The system of claim 14, further comprising a frame buffer for storing said existing fragment.

25. The system of claim 14, wherein said means for comparing said depth range for said new fragment with said depth range of said existing fragment comprises means for performing said comparison for a plurality of existing fragments, each representing a different surface, and said means for merging said new fragment with said existing fragment comprises means for performing said merge operation for one of said plurality of existing fragments for which there was an overlap.

* * * * *